March 24, 1959　　　E. M. KASS　　　2,878,725
MIRROR SUPPORT
Filed Jan. 31, 1955
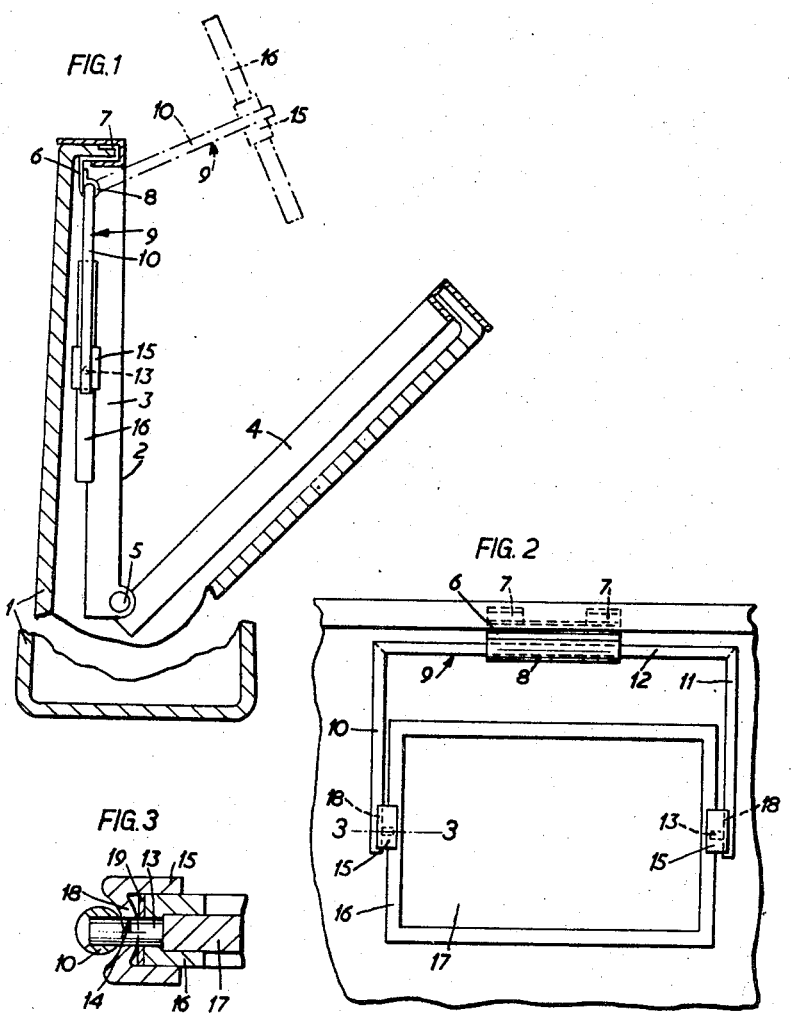
Inventor
Eric Michael Kass
By
Ferdinand Broster Bosshardt.
Attorney

United States Patent Office 2,878,725
Patented Mar. 24, 1959

2,878,725

MIRROR SUPPORT

Eric Michael Kass, New York, N.Y., assignor to Universal Leather Goods Company Limited, Blackburn, England, a British company Application January 31, 1955, Serial No. 485,015

1 Claim. (Cl. 88—97)

This invention relates to that kind of ladies' handbag which is furnished with a mirror. Usually the mirror is separate from the handbag and is stored loosely in a pocket provided in the handbag to hold the mirror. To use this mirror it is taken out of the handbag and held in the hand in position for use before the face. It is then inconvenient to hold both the mirror and the handbag, say when powdering the face, and it happens that the mirror or the bag is accidentally dropped or the contents of the bag accidentally fall out or that the mirror is laid down and its return to the handbag is forgotten. It also happens that when an article is being searched for in the handbag, the mirror falls out and is broken.

An object of this invention is to provide a handbag of the said kind in a novel form which obviates or reduces the hereinbefore stated disadvantages.

According to the invention, a ladies' handbag of the hereinbefore specified kind has its mirror connected to it by means which whilst preventing disconnection of the mirror from the handbag enables the mirror to be adjusted into a convenient position for use when desired.

The said means preferably includes a bracket carrying the mirror and swingably mounted on a suitable part of the bag to enable the mirror to be adjusted by the swinging of the bracket from a position of storage within the handbag into a position for use where it is supported by the bracket and therefore the handbag.

The said bracket may be adapted to be automatically held in various positions of adjustment, for example by frictional action.

The said mirror is preferably adjustable on the said bracket.

The mirror is preferably lockable in an angular position on the bracket, for example by a snap action.

The bracket is preferably mounted swingable in an arm fixed to a metal frame forming a part of the handbag.

The bracket is preferably of U-like shape with aligned pivots on which the mirror is mounted by means of lugs provided on a frame in which the mirror is framed.

The bracket is preferably adapted to be swung in the said arm from a downwardly projecting, storage position into another position for use of the mirror and the mirror is preferably adapted to be adjustable on the bracket about an axis which is parallel with the axis about which the bracket swings.

The said snap action is preferably attained by means of springiness of the parts of the bracket provided with the pivots, in conjunction with convex surfaces provided on the said parts to cooperate with concave surfaces provided on the said lugs.

The accompanying drawings illustrate more or less diagrammatically a constructional example of the invention. In the drawings:

Figure 1 is a fragmentary side view in medial section of portions of a ladies' handbag.

Figure 2 is a fragmentary front elevation of portions of the said handbag.

Figure 3 is a fragmentary plan view in section taken on a line corresponding to line 3—3 of Figure 2 and drawn to a larger scale.

Referring to the drawings, in the construction shown therein, as applied to a handbag comprising a bag 1 of pliable material mounted in a metal frame 2 composed of two major parts 3 and 4 respectively which are of inverted U-like shape and are hinged together at 5, there is an arm 6 made of bent sheet metal and generally of angle cross section, a part of the arm having hook-like lugs 7 secured in the major frame part 3 by spot welding, brazing or other means where the line bag is mounted in the said frame part 3. The arm 6 is formed with a tubular part 8 at its lower end. A swing bracket 9 is rotatably mounted in the tubular part 8 and consists of a piece of round section wire bent into a U-shape and having its two arm-like portions 10 and 11 respectively connected by a third portion 12 which extends through and is a tight fit in the tubular part 8 so that it is held frictionally in different positions of adjustment into which it can be rotated in the tubular part 8.

Each of the arm-like portions 10 and 11 is provided near its end with a horizontal pivot stud 13, the two studs 13 being in alignment and projecting towards each other. Each stud 13 engages a hole 14 in a lug 15 welded or brazed to a frame 16 in which a mirror 17 is framed. Each lug 15 is made of a bent piece of sheet metal of generally U-shape, but having a concavely bent portion 18 which can be engaged by the convex surface of the arm-like portion 10 or 11 in the vicinity of the pivot stud 13. The arm-like portions 10 and 11 are springy and they press inwards to cause yielding engagement of their convex surfaces with the concavely bent portions 18 and thereby yieldingly lock the said lugs 15 and therefore the frame 16 and mirror 17 in the plane of the bracket 10. There may be a filling member 19 welded or brazed in the hollow of each of the lugs 15 and having bearing holes for the studs 13 to increase the lengths of the bearing surfaces carrying the studs. When the engaging surfaces are forcibly displaced angularly until the convex surfaces no longer lie in the hollows of the concave bent portions 18, the mirror is free to be adjusted into other angular positions against friction exerted on the said lugs 15 by the arm-like parts 10 and 11.

When the mirror 17 is stored in the position of nonuse, as shown in full lines in Figures 1 and 2, the bracket 9 projects downwardly from the arm 6 and the mirror 17 is locked in the plane of the bracket 9 inside the handbag. The mirror 17 is held by the arm 6 and bracket 9 in the bag without interfering with the insertion or removal of other articles. When it is desired to use the mirror 17, the handbag is opened and the bracket 9 is swung forwards and upwards on the arm 6 into the position shown in dot-and-dash lines in Figure 1. The mirror 17 with its frame 16 is rotated on the bracket 9 into a convenient angular position for use, as indicated in dot-and-dash lines in Figure 1. In the position of the parts indicated in dot-and-dash lines, the mirror 17 is supported by the handbag in a position where it can be easily looked into.

The handbag can be rested on the lap or other support and the mirror be further rotated on the studs 13 until the user sees her reflection therein. Both hands can then be used in powdering the face or other operation, such as straightening the hair, the mirror 17 being fully supported by the handbag in nearly as convenient and steady a manner as if it were mounted on a dressing table. To return the mirror 17 to its stored position the movement of it and the bracket 9 are reversed. There is no possibility of the mirror being lost or falling out and being broken.

I claim:

A mirror support comprising a bracket adjustable into different angular positions, friction producing means acting on the bracket for holding it frictionally in different angular positions, said bracket being U-shaped and having substantially parallel arms with a rounded cross section, said bracket being springy, aligned pivot pins on the end of said bracket, a mirror, a frame on said mirror, lugs on the opposite sides of said frame, said lugs having holes engaged by said pivot pins, said lugs having a concave face towards said pivot pins mating with the rounded bracket arm, said mating concave lug and convex arm holding the frame and the mirror yieldingly in the U-shaped portion of said bracket, the projecting parts of the concave lug forceably engaging the bracket arms against their springiness to provide angular adjustment for said mirror, whereby frictional engaging means on the bracket may position the bracket and its arms in a desired angular position, and the mating lug and arms may further position the mirror and frame relative to the bracket arms at a desired angular position.

References Cited in the file of this patent

UNITED STATES PATENTS

| | | |
|---|---|---|
| 310,611 | Peck | Jan. 13, 1885 |
| 510,072 | Lebrun | Dec. 5, 1893 |
| 858,152 | Coffman | June 25, 1907 |
| 1,701,300 | Glieberman | Feb. 5, 1929 |
| 2,111,079 | Spear et al. | Mar. 15, 1938 |
| 2,368,959 | Winslow | Feb. 6, 1945 |